United States Patent [19]

Kuroda et al.

[11] Patent Number: 5,386,555
[45] Date of Patent: Jan. 31, 1995

[54] DATA PROCESSING SYSTEM HAVING A PLURALITY OF UNITS IN WHICH DESIGN OF THE SYSTEM CAN BE CHANGED BY SIMPLE DEFINITION

[75] Inventors: Tetsuji Kuroda, Tama; Kazuyoshi Haraguchi, Chofu, both of Japan

[73] Assignee: Casio Computer Co., Ltd., Tokyo, Japan

[21] Appl. No.: 823,758

[22] Filed: Jan. 22, 1992

[30] Foreign Application Priority Data

Jan. 29, 1991 [JP] Japan .................. 3-028102
Jan. 29, 1991 [JP] Japan .................. 3-028103

[51] Int. Cl.6 .................. G06F 7/00; G06F 13/14
[52] U.S. Cl. .................. 395/600; 364/230; 364/282.4; 364/281.3; 364/DIG. 1
[58] Field of Search .................. 395/600, 650; 364/405, 364/406, 408

[56] References Cited

U.S. PATENT DOCUMENTS

| | | | |
|---|---|---|---|
| 4,360,872 | 11/1982 | Suzuki et al. | 364/405 |
| 4,503,499 | 3/1985 | Mason | 395/650 |
| 4,805,107 | 2/1989 | Kieckhafer | 395/650 |
| 4,852,000 | 7/1989 | Webb et al. | 364/406 |
| 4,893,232 | 1/1990 | Shimaoka | 395/600 |
| 4,910,676 | 3/1990 | Alldredge | 364/408 |
| 5,058,162 | 10/1991 | Santon | 380/25 |

Primary Examiner—Thomas G. Black
Assistant Examiner—Jennifer M. Orzech
Attorney, Agent, or Firm—Frishauf, Holtz, Goodman & Woodward

[57] ABSTRACT

A data file arranged in one-to-one correspondence with one unit, and a connection definition table, arranged in correspondence with each unit, for defining a data file of an arbitrary unit to which data is to be transmitted, are arranged. The unit processes data in its own data file, and writes the processed data in a data file defined by the connection definition table.

2 Claims, 9 Drawing Sheets

DATA PROCESSING SYSTEM HAVING A PLURALITY OF UNITS IN WHICH DESIGN OF THE SYSTEM CAN BE CHANGED BY SIMPLE DEFINITION

BACKGROUND OF THE INVENTION

1. Field of the Invention

The present invention relates to a data processing system, which can divide a processing content into a plurality of processing units to systemize the divided processing contents.

2. Description of the Related Art

Various work processing systems are present in correspondence with the types of industries and businesses. For example, the work processing systems include financial terminals for account processing in the financial business, POS terminals for commodity management processing, sales management processing, customer management processing, and the like in the retail business, portable terminals utilized for reordering in the retail business, and as consultation terminals for supporting sales persons in various business fields, production management terminals for production management processing in the manufacturing business, and the like.

When a work processing system of this type is constituted, works to be systemized are classified into some groups, and application systems are constituted in units of systems and sub systems. For example, in an order reception associated work program for performing order reception associated works, the order reception associated works such as an order reception work, a response delivery date setting work, a delivery work, and the like are constituted by a series of programs. Predetermined files are prepared for these programs, and data processing is executed based on the files.

However, such a conventional data processing apparatus processes associated works using a series of programs. For this reason, when a system according to user's requirements is to be constituted, modifications of the programs are troublesome since various works are present depending on users. More specifically, when an already completed application system is to be utilized, both system functions which are suitable for the flow of existing work processing, and those which are not suitable for the flow are present. In this case, not only unsuitable program portions but also the overall programs must be modified.

Since a unit of systemization corresponds to a group of works, the completed results (programs, files, and the like) do not always perfectly coincide with actual works, and it tends to be difficult for users to understand system functions.

The conventional data processing apparatus processes associated works using common files based on the series of programs. For this reason, each processing unit cannot manage which data can be used in which works. More specifically, in some conventional apparatuses, a series of processing operations can be divisionally processed. However, since data management is not clearly divided, which data can be processed or which data should be processed often becomes unclear, thus disturbing smooth work operations.

SUMMARY OF THE INVENTION

It is an object of the present invention to provide a system, which can realize a change in design of a system including a plurality of processing units by simple definitions of an operator without changing programs.

In order to achieve the above object, according to the present invention, for each unit of a data processing system constituted by a plurality of units, data stored in a data file arranged in correspondence with one unit is processed according to a processing command set in advance for the corresponding unit. If a unit connection command definition is set in correspondence with the unit, the next unit defined by the connection command definition is designated, and the data processed in the processing step is transferred to a data file arranged in correspondence with the next unit.

Therefore, according to the present invention, a change in design of a system including a plurality of processing units can be realized by simple definitions of an operator without changing programs.

Data to be processed in each processing unit is held in each processing unit. When data processing is performed while designating a processing unit, a list of data in the processing unit is displayed. Therefore, data to be processed in each processing unit can be immediately known.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENT

FIGS. 1 through 9 show an embodiment of a data processing apparatus.

Figure 1:
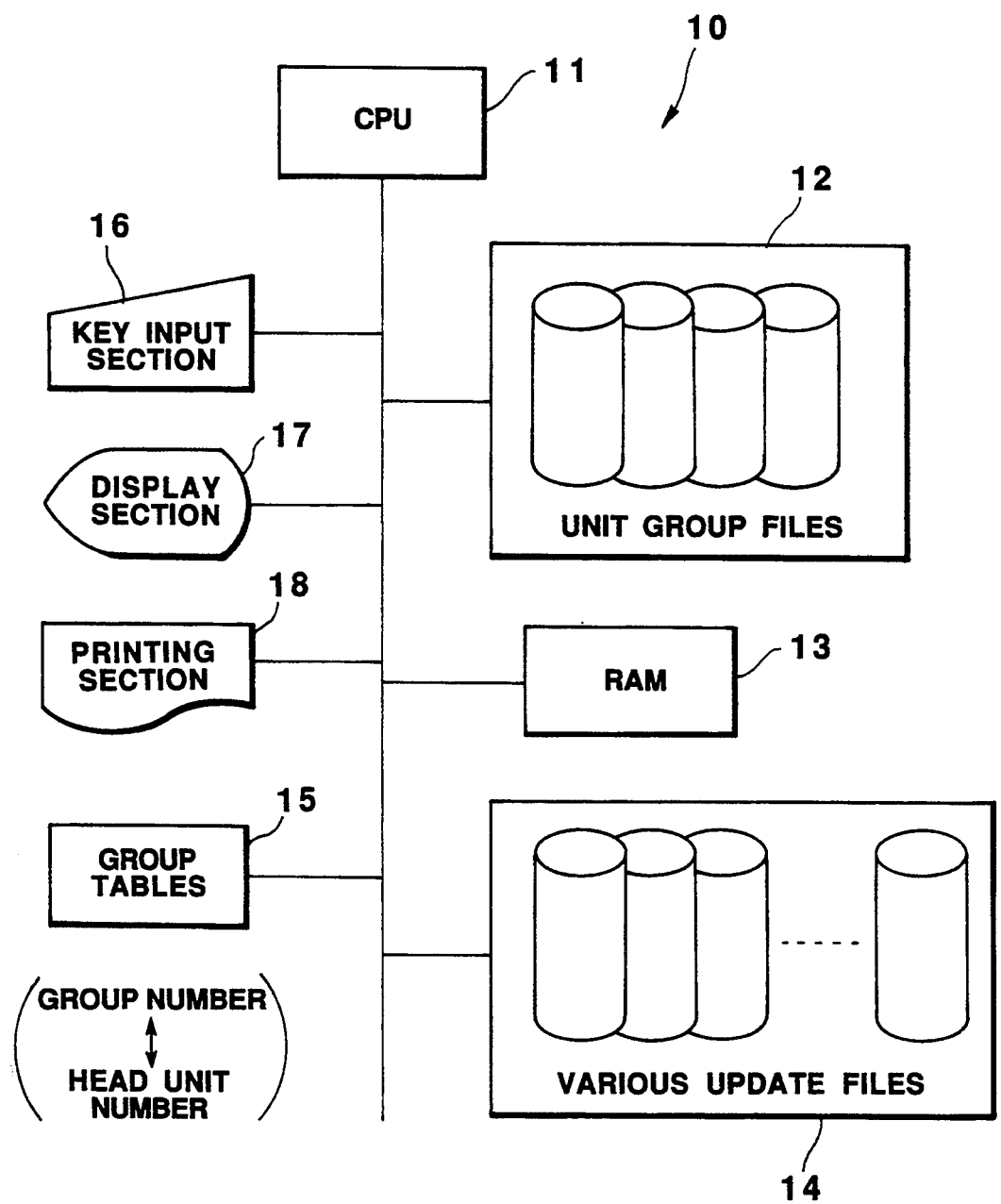
FIG. 1 is a block diagram of a data processing unit.

The arrangement will be described below. FIG. 1 is a block diagram of a data processing apparatus 1. In FIG.

1, reference numeral 11 denotes a CPU for controlling the overall apparatus, and various data processing operations including work unit processing and system design processing (to be described later). The CPU 11 controls various operations of the data processing apparatus according to microprograms stored in a ROM (not shown). The CPU 11 is connected to group files 12, which include files of a plurality of standardized work unit groups (e.g., an order reception work unit groups, a sales work unit group, and a charge work unit group, see FIGS. 2A through 2C), a RAM 13 for temporarily storing various data, various updating files 14 such as a master file used when file changing processing is performed, a register file, a totalization file, a marketing management file, and the like, group tables 15, in which head unit Nos. corresponding to group Nos. are stored in the form of tables, and from which a unit No. to be processed first can be retrieved, an input section 16 comprising a keyboard having keys for inputting various data, function keys, and the like, a display section 17 for displaying input data, print data, and the like, and a printing section 18 for printing the print data.

Figure 2A:
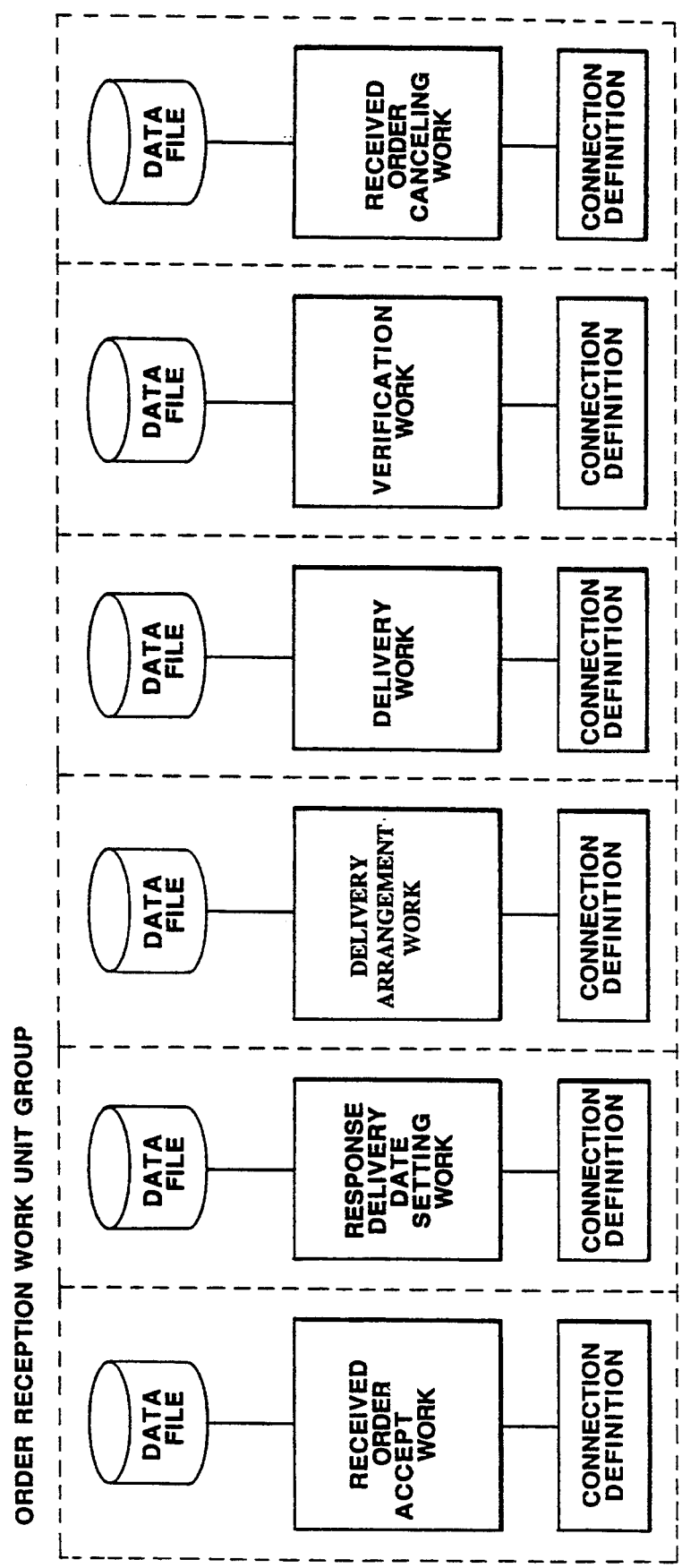
FIG. 2A is a diagram showing the structure of order reception work units.
Figure 2B:
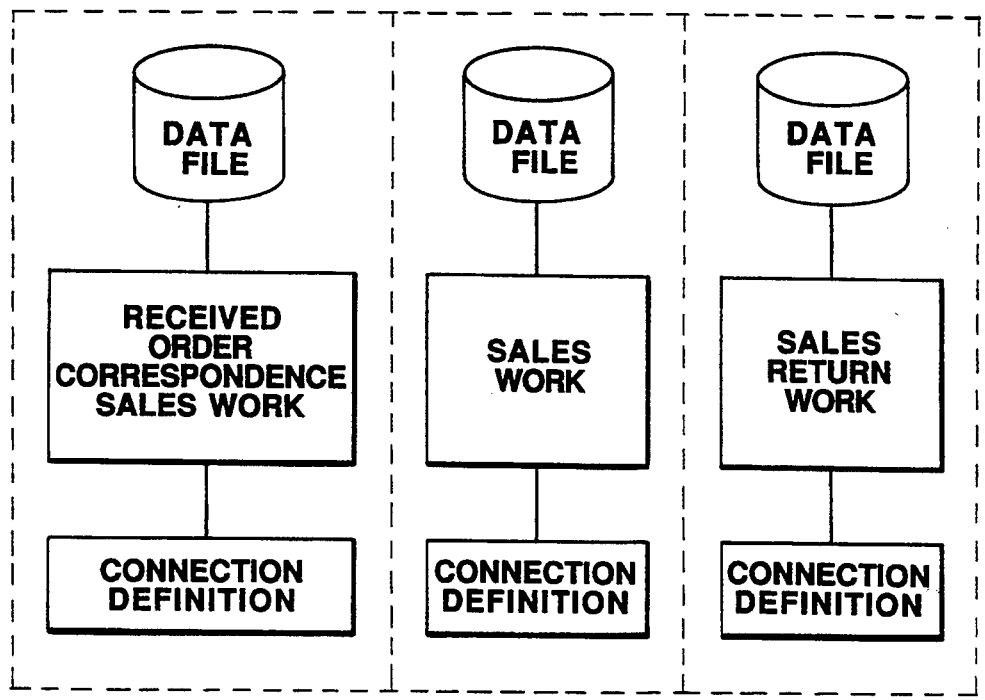
FIG. 2B is a diagram showing the structure of sales work units.
Figure 2C:
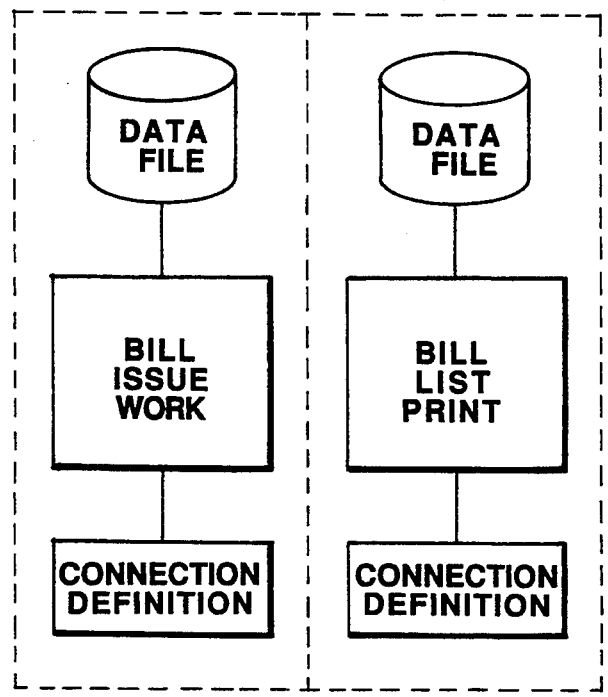
FIG. 2C is a diagram showing the structure of change work units.

FIGS. 2A through 2C show the structures of various standardized work unit groups. FIG. 2A shows the order reception work unit group, FIG. 2B shows the sales work unit group, and FIG. 2C shows the charge work unit group. These unit groups are stored in the corresponding ones of the group files 12 shown in FIG. 1.

Figure 3:
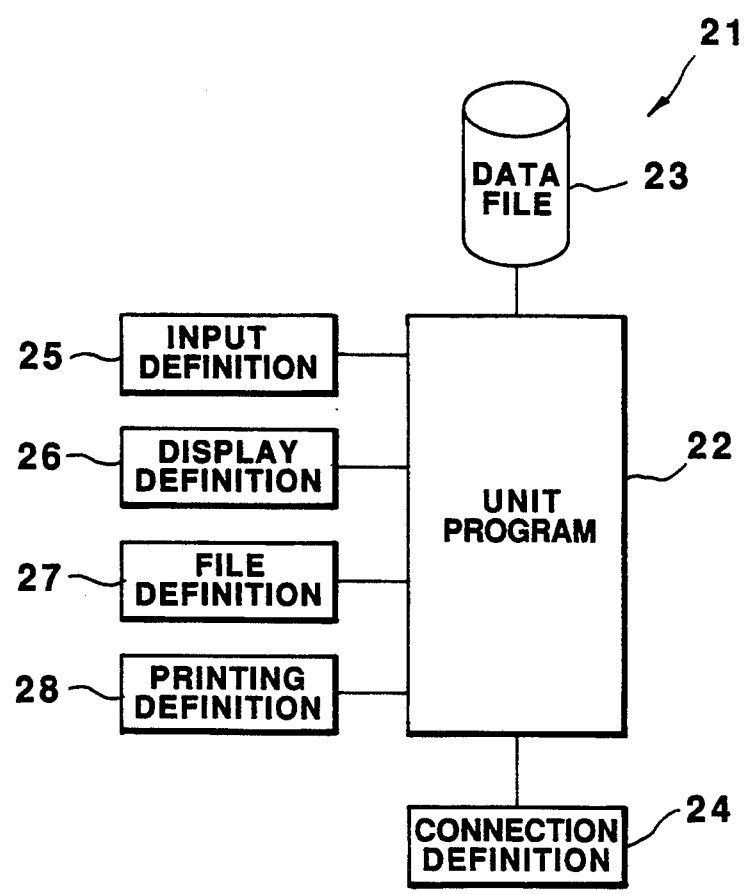
FIG. 3 is a diagram showing the structure of one unit in the data processing apparatus.

Each work unit group is constituted by a plurality of units which are standardized in advance according to their work contents. FIG. 3 shows the structure of one work unit. Each unit 21 comprises a basic processing program 22 for storing an identification name of the unit, e.g., a unit number, a data file 23 arranged to have a one-to-one correspondence with the unit 21, a connection definition table 24 for defining an identification name, e.g., a unit name, of the next unit to which data is to be transmitted, and definition tables 25 through 28 corresponding to various processing command definitions of data processing standardized in advance in the unit 21, i.e., corresponding to an input command definition, a display command definition, a file command definition, and a printing command definition. The unit 21 has a basic function of processing data in its own data file 23 on the basis of the command definitions in the definition tables 25 through 28, and a function of writing processed data in a data file of a unit having a unit number defined by the connection definition table 24. More specifically, each of the plurality of standardized units 21 constituting one work unit group comprises a data file 23 for storing data to be processed in the corresponding unit, and a connection definition table 24 for defining a unit to which the processed data is to be transmitted, and processed data of the respective units are linked according to the connection definitions.

For example, the order reception work unit group shown in FIG. 2A will be exemplified below. In general, in the order reception works, after a received order is accepted, management works for the received order, i.e., a response delivery date setting work, a delivery arrangement work, a verification work, and the like, are performed. In a conventional system, these works are defined as an order reception program, and the order reception program is created by a series of programs. However, in this embodiment, these works are classified into six standardized work units, i.e., a "received order accept work", a "response delivery date setting work", a "delivery arrangement work", a "delivery work", a "verification work", and a "received order canceling work", as shown in FIG. 2A. Each of these units comprises a data file and a connection definition table. For example, when a connection definition to a response delivery date setting work unit is set in a connection definition table of the received order accept work unit in FIG. 2A, data processed by the received order accept work unit is stored in the data file of the response delivery date setting work unit as the next work unit. Information associated with a response delivery date is added in the response delivery date setting work unit on the basis of the stored data. In this manner, processing units are freely combined to constitute the order reception work unit group. For this reason, if delivery date management is not required, a unit associated with the delivery date management can be omitted (i.e., the connection definition table does not set a data file of the corresponding unit). Thus, the connection relationship among the units can be easily changed, and multiple-branch connections can be realized.

When a series of processing operations are executed by a plurality of units, processing in each unit cannot be started unless the first unit in the work unit group is designated. In this embodiment, a unit to be processed first is stored in the group tables 15 shown in FIG. 1. The group tables 15 store numbers of head units to be processed first in units of work unit groups. For example, when order reception work processing is to be executed, the group tables 15 are looked up to retrieve the number of the head unit of the order reception work. When the number of the head unit is obtained, data is transmitted to the data file of the next unit according to connection information, i.e., the unit number of the next unit, set in the connection definition table.

The operation of this embodiment will be described below.

Figure 4:
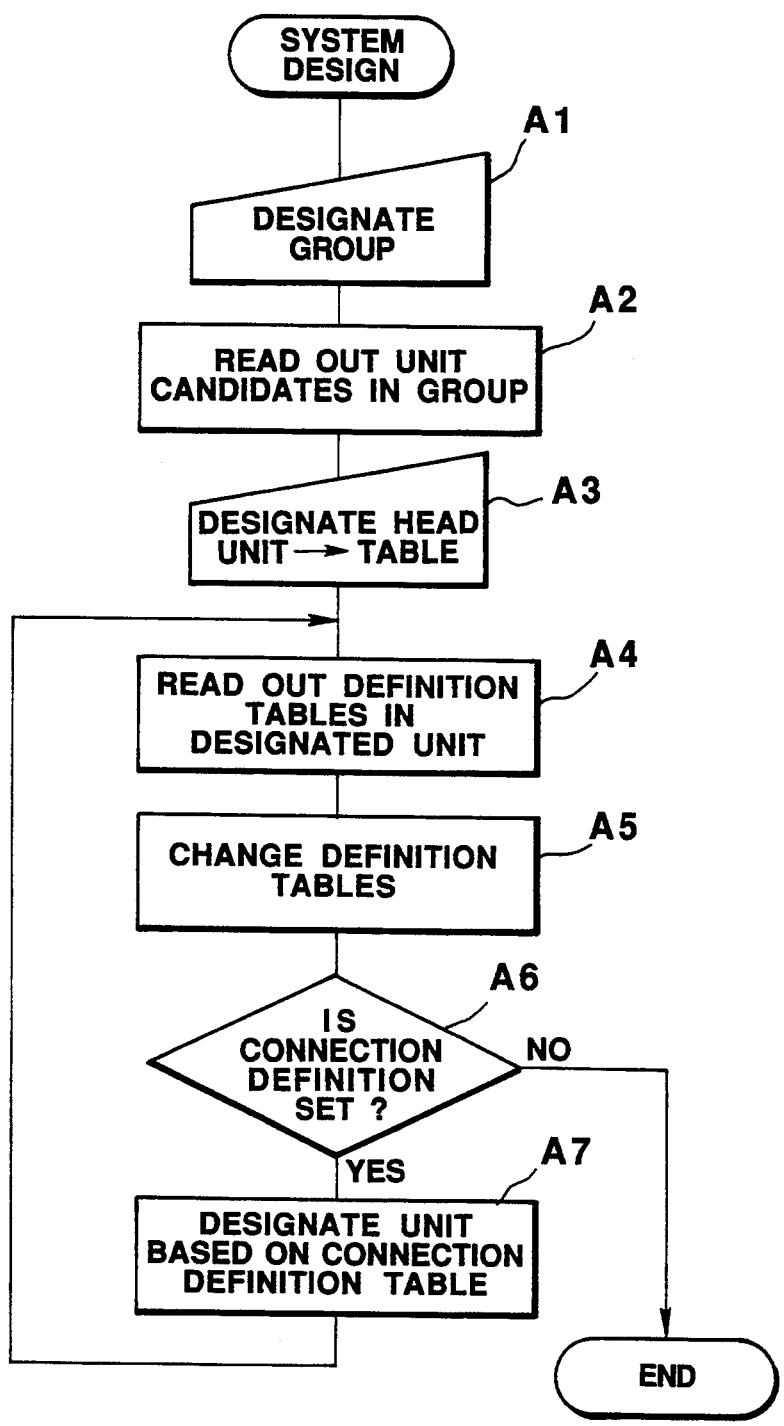
FIG. 4 is a flow chart showing system design processing.

FIG. 4 is a flow chart showing the system design of the data processing apparatus.

Figure 5:
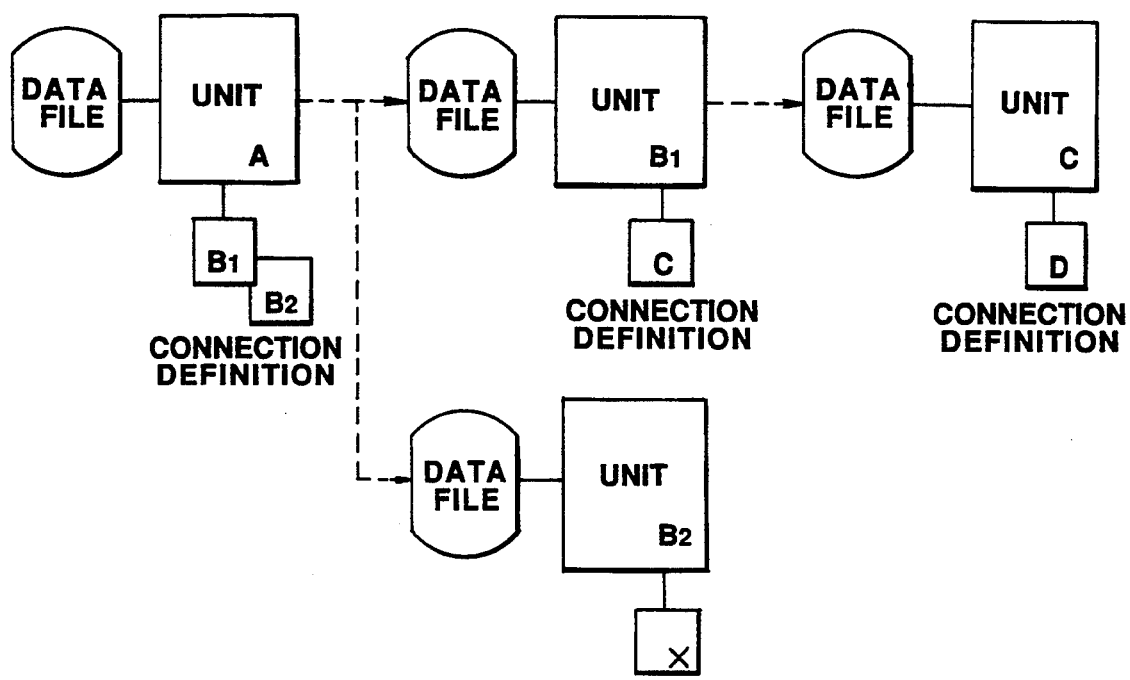
FIG. 5 is a diagram showing a first connection state of units.

In step A1, a work unit group to be designed is determined, and is designated. In step A2, all the units in the designated work unit group are read out from the unit group files 12, and are displayed on the display section 17. In step A3, an operator designates a unit to serve as the head unit from the displayed units, and sets the number of the designated unit in the group tables 15. For example, in the case of FIG. 2A, there are six candidates of the standardized units. When a designer such as a system engineer (SE) confirms and designates the head unit, the designated unit is stored in the group tables 15 as a head unit No. corresponding to the group No. In step A4, the definition tables in the designated unit are read out, and in step A5, the operator changes the definitions in the necessary definition tables. More specifically, if the definitions (the definitions for the input definition table 25, the display definition table 26, the file definition table 27, the slip definition table 28, and the connection definition table 24) of the overall processing content in the designated unit are required to be changed, they are set in this step. In step A6, it is checked if a connection definition was set in step A5. If it is determined in step A6 that a connection definition was set, the flow advances to step A7, and a unit is designated based on the unit number set in the connection definition table 24. Thereafter, the flow returns to step A4. However, if it is determined in step A6 that no connection definition was set, the system design is ended. For example, when units "B₁" and "B₂" are set as the content of the connection definition of a unit A, the corresponding units $B_1$ and $B_2$ are designated, and the definition tables of the units $B_1$ and $B_2$ are read out, thus performing definitions for these units. FIG. 5 shows the connection states of the units designed in this manner. As shown in FIG. 5, since the content of the connection definition of the unit A includes "$B_1$" and "$B_2$", processed data is transmitted to the data files of the units $B_1$ and $B_2$, and predetermined processing operations are executed in these two units. Data processed in the unit $B_1$ is transmitted to the data file of the unit C. Since no definition is made in the connection definition of the unit $B_2$, data processed in the unit $B_2$ is not transmitted to other units.

Figure 6:
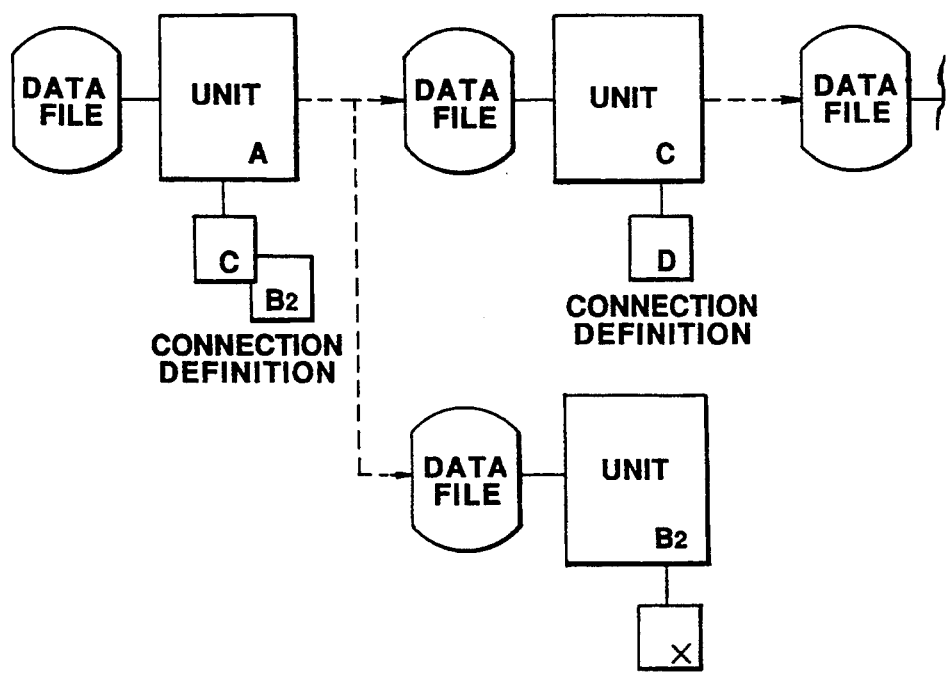
FIG. 6 is a diagram showing a second connection state of units.

FIG. 6 shows a case wherein the connection state shown in FIG. 5 is changed. As shown in FIG. 6, when processed data of the unit A is to be transmitted to the unit C without being output to the unit $B_1$, "$B_1$" in the connection definition table of the unit A need only be changed to "C". Thus, the connection relationship among units can be very easily changed, and multiple-branch connections can be easily realized.

Figure 7:
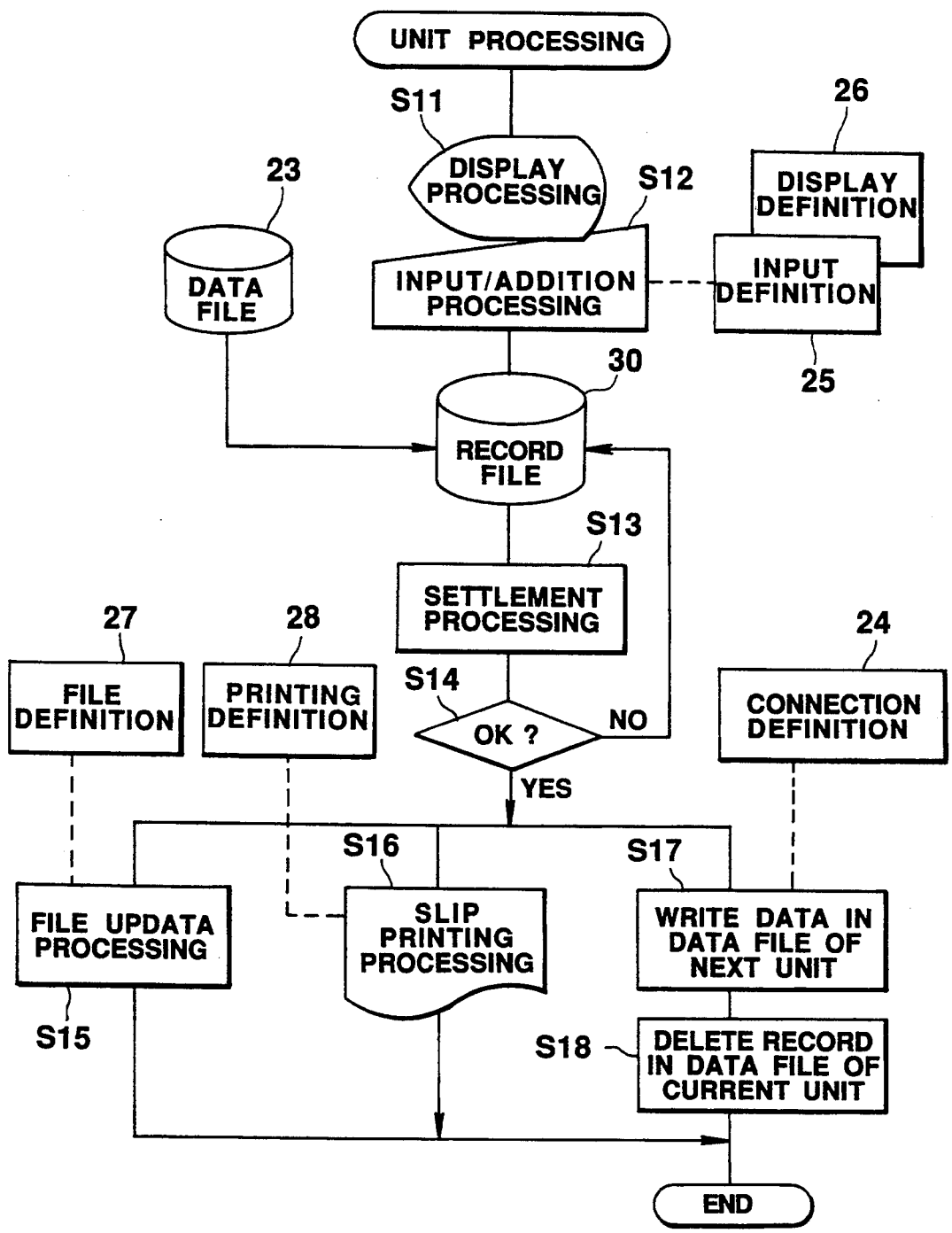
FIG. 7 is a flow chart showing the relationship between the processing flow in one unit, and definition tables.

FIG. 7 is a flow chart showing the flow of processing in one unit, and the relationship among the data file 23 and the definition tables 24 to 28.

In steps S11 and S12, display processing and input processing are executed according to the display command definition and the input command definition respectively set in the display definition table 26 and the input definition table 25, which are defined and set in advance, and input/addition data are stored in a record file 30 (prepared in the RAM 13). Data in the data file 23 is also transferred to the record file 30. In step S13, settlement processing of input data stored in the record file 30 is performed to check validity of data (step S14). In this settlement processing, a manager settles whether or not data input by an input operator are proper (e.g., whether or not data can be accepted as a received order). If the validity of data is determined (OK) in the settlement processing, the flow advances to steps S15, S16, and S17; otherwise, the data are left stored in the record file 30 to wait for the next settlement processing. In step S15, file update processing is performed according to the definition content defined and set in the file definition table 27. In step S16, slip printing processing is executed according to the slip definition table 28, thus ending processing of this flow. Note that the file update processing includes processing for updating accept dates, order reception conditions, and the like on a received order accept register. As the slip printing processing, in, e.g., the order reception works, if an accept slip is issued when "OK" is determined in the received order accept settlement, an accept slip is printed in a format according to the slip definition. Furthermore, if "OK" is determined in the settlement processing in step S14, the next unit is designated according to the unit number defined in the connection definition table 24 of the corresponding unit, and data (record) processed by the corresponding unit is written in the data file of the designated unit in step S17. In step S17, when a plurality of connection definition tables are set, units corresponding to the unit numbers set in these connection definition tables are designated, and data is written in the data files of these units. In step S18, the record in the data file of the currently designated unit is deleted, thus ending processing of this flow. When the above-mentioned processing is repetitively executed, only records, which are not "OK" in the settlement processing, are left in the record file 30.

In this manner, the data file 23 initially stores no records taken over from units in the previous stage, and the data file 23 and the input record file 30 store the same data. The file update processing is executed on the basis of OK data in the settlement processing, and processed data (record) is transmitted to the data file 23 of the next connected unit. In the next unit, a record transmitted to the data file 23 is transferred to the record file 30. After predetermined input/addition processing (e.g., order reception work processing in order reception, or response delivery date setting work processing in response delivery date setting) is performed for this record file 30, the same settlement processing as described above is performed.

Figure 8:
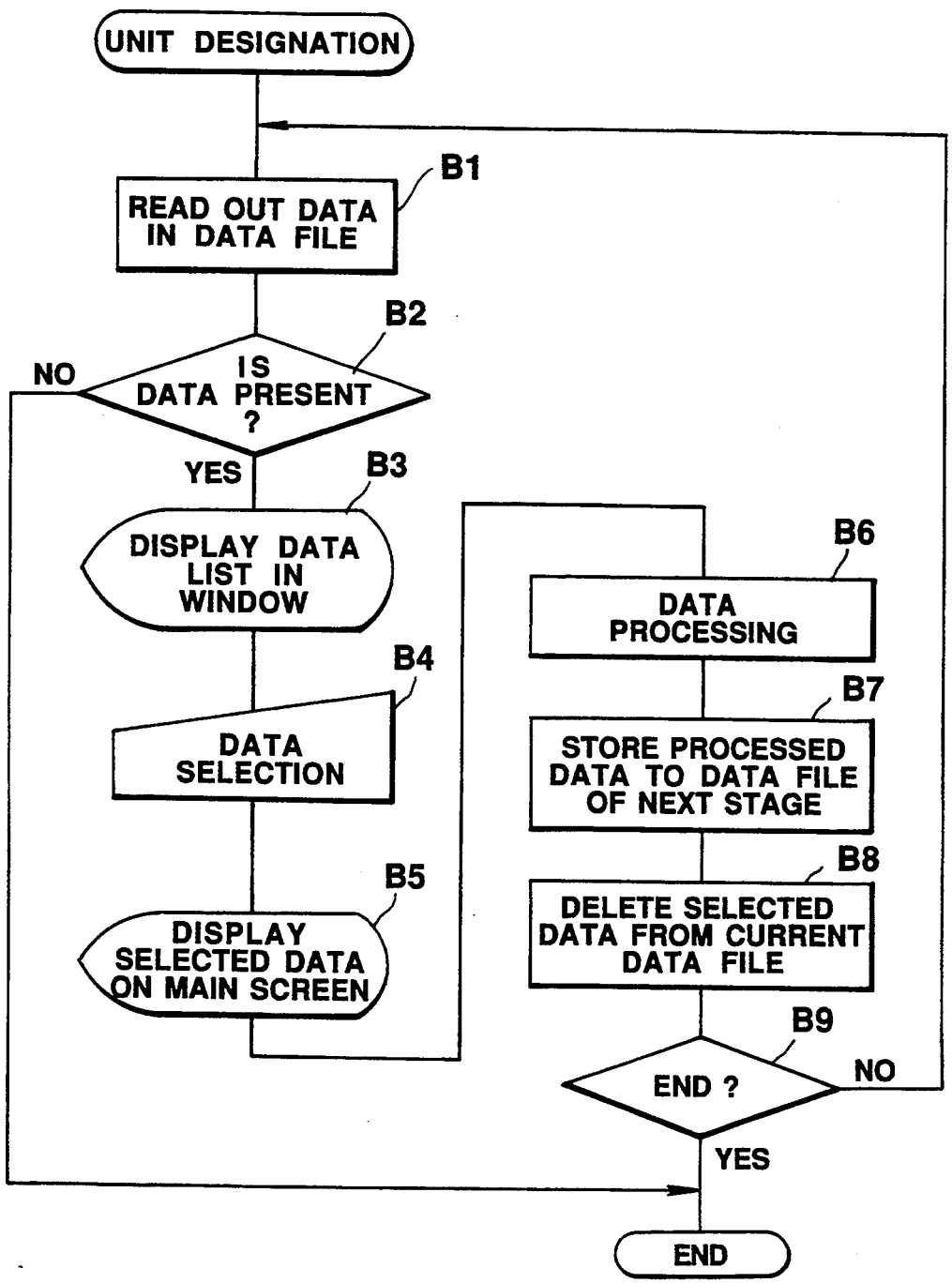
FIG. 8 is a flow chart for explaining a processing operation by a unit program.

FIG. 8 is a flow chart for explaining a processing operation by the unit program 22 shown in FIG. 3.

In step B1, data in the data file 23 of the currently designated unit are read out, and it is checked in step B2 if there are data in the corresponding data file 23. If there is no data (record) to be processed, the processing is ended; otherwise, a list of data is displayed on a predetermined display area of the display section 17 as a window message in step B3. In step B4, data to be processed is selected from the list of data displayed as the window message by, e.g., a key operation, and the selected data is displayed on the main screen of the display section 17 in step B5. In step B6, predetermined data processing of the data displayed on the main screen is performed. The data processing is performed based on the definitions set in the various definition tables 25 to 28. In step B7, a unit corresponding to a unit number set in the connection definition table 24 of the corresponding unit is designated, and processed data (record) processed by the corresponding unit is transmitted to and written in the data file of the designated unit. In step B8, the selected data (record) in the data file of the currently processed unit is deleted. It is checked in step B9 if the above-mentioned processing is completed. If it is determined that the processing is completed, the processing is ended; otherwise, the flow returns to step B1.

Figure 9:
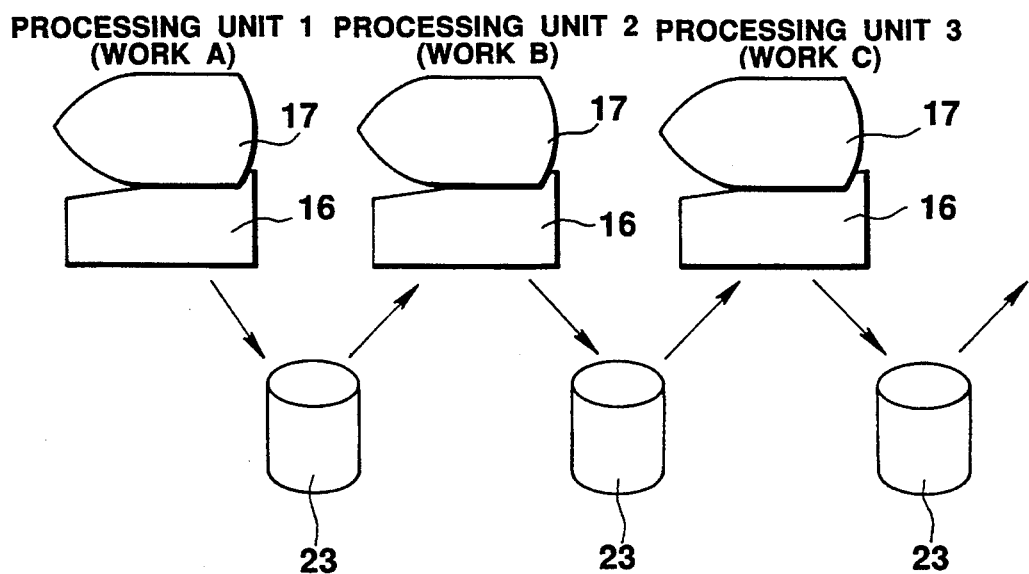
FIG. 9 is a diagram showing transmission of processing data among a plurality of units.

In this manner, the data file 23 is provided for each unit 21, and when data is processed in each unit 21, the content of the data file 23 can be displayed as a list. Since the data file 23 stores only data (records) to be processed in the unit, all the data displayed in a list can be processed. More specifically, since the data file 23 is provided in one-to-one correspondence with each unit 21, only a record subjected to data processing is preserved in the data file 23 of the next unit, and an original of the processed record is deleted from the source data file 23, as shown in FIG. 9. Therefore, when the next processing is to be performed, records to be processed can be detected by simply watching a list display of data stored in the data file. In this manner, although a conventional system cannot manage which data can be used in which work when common files are used, the apparatus of this embodiment can eliminate such a drawback.

A detailed description will be made below with reference to FIG. 9. FIG. 9 shows a connection pattern when information transmission is performed in processing units 1, 2, 3 . . . In FIG. 9, when information to be transmitted to a processing unit 2 (work B) is generated as a processing result of a processing unit 1 (work A), the information is output to the data file 23. On the other hand, the processing unit 2 (work B) selects necessary information while looking up the content of the data file 23 so as to perform an input operation. The data file 23 stores connection information output from the processing unit 1 (work A) in the form of an instruction record. The processing of the processing unit 2 (work B) is normally performed on the main screen of the display section 17. When it is necessary to look up the content of the data file, the sub screen of the display section 17 is temporarily displayed to overlap the main screen (sub-window display). A user can designate which information of a list of instruction records displayed on the sub screen is to be fetched in the processing unit 2 (work B). Upon completion of the processing in the processing unit 2, the designated instruction record is deleted. In this manner, the data file 23 can hold only records waiting to be processed in the processing unit 2 (work B). Therefore, all the pieces of information displayed on the sub screen can be regarded as candidates of objects to be processed in the processing unit 2 (work B).

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data processing system for processing data by a plurality of data processing units, comprising:
    a plurality of data files;
    a plurality of unit means arranged in one-to-one correspondence with said plurality of data files, each for processing, in response to a predetermined processing command, individually a plurality of types of data stored in a corresponding one of said plurality of data files;
    a plurality of table means, arranged in one-to-one correspondence with each of said plurality of unit means, for storing identification names corresponding to whichever of said plurality of unit means the one of said unit means corresponding to a particular one of said table means is to be connected; and
    one of said unit means including means for:
        storing data transferred from another one of said plurality of unit means into the data file corresponding to said one unit means,
        processing individually each type of data selected by an operator from among the plurality of types of data stored in one of said plurality of data files corresponding to said one unit means,
        determining whether or not any of said identification names is stored in the table means corresponding to said one unit means,
        transferring the individually processed types of data to each of the plurality of unit means corresponding to the plurality of identification names that are determined to be stored in the table means corresponding to said one unit means, and
        deleting the selected data from the data file corresponding to said one unit means after the transfer is completed.

2. A data processing method in a data processing system having a plurality of units, comprising the steps of:
    executing a first process with a first unit with respect to each data selected by an operator from among a plurality of data stored in a first file arranged in correspondence with the first unit to thereby generate first data, with a first identification name being associated with said first unit;
    referring, by means of the first unit, to a second identification name and a third identification name stored in a first connection table arranged in correspondence with the first unit;
    transferring, by means of the first unit, the generated first data to a second file designated by the second identification name and a third file designated by the third identification name;
    deleting, by means of the first unit, the selected data from the first file after the first data is transferred to the second and third files;
    executing a second process with a second unit with respect to the first data transferred and stored in the second file to thereby generate second data;
    executing a third process with a third unit with respect to the first data transferred and stored in the third file to thereby generate third data;
    referring, by means of the second unit, to a fourth identification name stored in a second connection table arranged in correspondence with the second unit;
    transferring, by means of the second unit, the generated second data to a fourth file designated by the fourth identification name; and
    executing a fourth process with a fourth unit with respect to the second data transferred and stored in the fourth file to thereby generate fourth data.

* * * * *